United States Patent
Tomchak

(10) Patent No.: US 6,824,180 B2
(45) Date of Patent: Nov. 30, 2004

(54) QUICK CONNECT TOOL

(75) Inventor: Michael Tomchak, Harrisburg, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 151 days.

(21) Appl. No.: 10/352,667

(22) Filed: Jan. 28, 2003

(65) Prior Publication Data

US 2004/0145198 A1 Jul. 29, 2004

(51) Int. Cl.[7] .............................. A01B 1/22; B25G 3/28
(52) U.S. Cl. ............................ 294/57; 294/51; 15/145; 24/614; 403/326; 403/361
(58) Field of Search ............................ 294/51, 57, 19.1; 15/145, 147.1; 403/326, 329, 356, 361, 373, 374.1; 24/580.11, 614, 666

(56) References Cited

U.S. PATENT DOCUMENTS

| | | | |
|---|---|---|---|
| 803,420 A | | 10/1905 | Koegel |
| 903,529 A | | 11/1908 | Wray |
| 986,761 A | * | 3/1911 | Roscoe ........................ 403/361 |
| 2,070,555 A | | 2/1937 | Aylwin |
| 3,100,665 A | | 8/1963 | Duppenglesser |
| 3,181,189 A | * | 5/1965 | Leyden ........................ 15/145 |
| 4,247,216 A | | 1/1981 | Pansini |
| 4,688,337 A | * | 8/1987 | Dillner et al. ................ 24/616 |
| 4,927,287 A | * | 5/1990 | Ohkawa et al. ............... 24/458 |
| 5,375,286 A | | 12/1994 | Harrah |
| 5,379,478 A | * | 1/1995 | Vosbikian ..................... 15/145 |
| 5,483,720 A | * | 1/1996 | Decoopman et al. ......... 15/145 |
| 5,487,397 A | | 1/1996 | Bean |
| 5,615,442 A | | 4/1997 | Schroeck et al. |
| 5,924,816 A | | 7/1999 | Schuele |
| 6,029,308 A | | 2/2000 | Smith |
| 6,220,639 B1 | | 4/2001 | Aquilina |
| 6,328,361 B1 | | 12/2001 | Spear |
| 6,687,964 B2 | * | 2/2004 | Vanderpool ................... 24/614 |
| 6,698,966 B2 | * | 3/2004 | Hilton et al. ................ 403/326 |

* cited by examiner

*Primary Examiner*—Eileen D. Lillis
*Assistant Examiner*—Paul T. Chin
(74) *Attorney, Agent, or Firm*—William F. Lang, IV; Eckert Seamans Cherin & Mettlott, LLC

(57) ABSTRACT

A quick connect assembly provides a male portion with a pair of arms defining teeth on their outer surface, and a female portion having a sleeve, defining inward facing teeth corresponding to the outward facing teeth of the male portion. Insertion of a handle upon which the male portion has been secured into the female portion will cause the teeth of the male portion to engage the teeth of the female portion, securing the handle in its desired location.

20 Claims, 5 Drawing Sheets

US 6,824,180 B2

QUICK CONNECT TOOL

BACKGROUND OF THE INVENTION

1. Field of the Invention

The present invention provides an improved connection for the handle of a shovel.

2. Description of the Related Art

An example of a presently available quick connection apparatus is described in U.S. Pat. No. 6,328,361, issued to K. J. Spear on Dec. 11, 2001. This patent describes a tool with a removable handle. The tool includes a handle having a lug 24, within a socket. The lug defines a plurality of outwardly facing teeth dimensioned and configured to engage inwardly facing teeth within the socket. Both the lug and the socket are made from flexible material, permitting the teeth to move out of each other's way during insertion of the handle into the socket, and then to engage each other to prevent removal of the handle.

Although the above-described quick connect apparatus has proven to be satisfactory, there remains a desire for a quick connect apparatus providing an even more secure connection and greater flexibility in tolerances, which would both simplify manufacturing and ensure the durability of the resulting tool.

SUMMARY OF THE INVENTION

The present invention provides an improved quick connect assembly for connecting the handle of a tool, for example, a shovel such as a snow shovel, to the tool itself. The quick connect assembly includes a male component for mounting on the handle, and a female component for mounting on the tool.

The male component is preferably an elongated piece, structured for mounting at the lower end of the handle of a shovel. The male component includes a top end and a bottom end, connected by a central portion. The top portion and bottom portion each preferably define an aperture, for receiving a screw or bolt for securing the male component to a handle. The bottom surface of the male component is structured to fit against the handle, and will therefore preferably be concave, with the concave surface defining a radius substantially equal to that of the handle. The tip of the bottom portion may be tapered. A pair of arms extend upward and slightly outward from the bottom portion, adjacent to the central portion. Each of these arms defines outward facing teeth, for engaging corresponding teeth within the female connection portion, described below.

The female connection portion includes a sleeve having an open top end, and a bottom end which may be closed. The interior of the sleeve is dimensioned and configured to receive both the handle and the male component secured to the handle. The inside of the sleeve will therefore have a substantially cylindrical portion for receiving the handle, and a connection portion for receiving the male components. Two of the vertical walls within the connection portion include inward facing teeth, dimensioned and configured to engage the outward facing teeth on the arms of the male portion. The female portion may define an opening within the top of the connector receiving portion, thereby permitting access to the arms of the male connector portion, permitting the handle to be released from the shovel if desired. Additional means for securing the handle to the shovel may be provided in the form of an aperture for receiving a bolt or screw passing through the female connection portion and into the handle.

During manufacture of the shovel, the female connection portion will be secured to the shovel itself, and the male connection portion will be secured to the handle. The shovel may then be shipped to its final destination with its handle removed, thereby increasing the number of shovels that may be shipped within the same size package. Once shipment is complete, the handle may be inserted into the shovel, at which point the arms on the male connection portion will be pushed inward against their outward bias by the female connection portion, until insertion is complete, at which point the teeth on these arms will engage the corresponding teeth within the female connection portion. The handle will now be secured within the shovel, and may be further secured by passing a screw or bolt through the female connection portion and into the handle. If desired, the handle may be released from the shovel by reaching into the opening within the female connection portion with an appropriate tool, pushing the arms of the male connection portion inward, and then removing the handle.

BRIEF DESCRIPTION OF THE DRAWINGS

Like reference characters denote like features throughout the drawings.

DETAILED DESCRIPTION OF THE PREFERRED EMBODIMENTS

Figure 1:
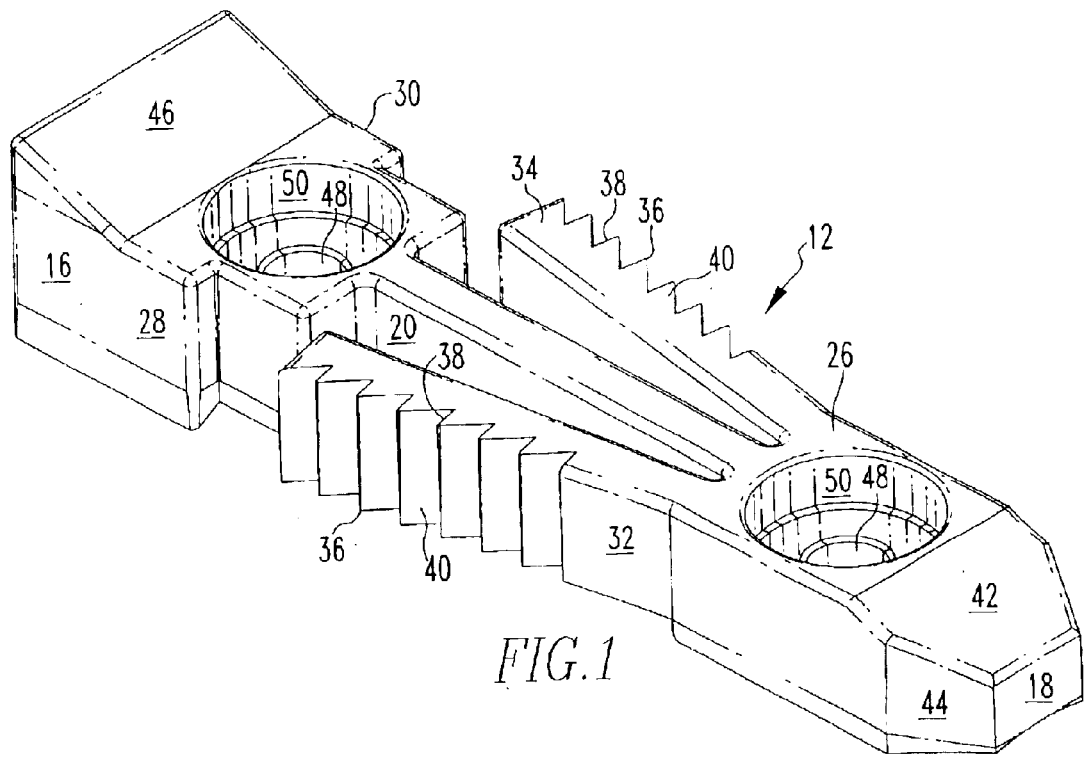
FIG. 1 is an isometric front view of the male component of a quick connect assembly according to the present invention.

The present invention provides a quick connect apparatus structured to permit a handle to be quickly and securely inserted into a tool, permitting use of the tool. Referring to the drawings, the quick connect assembly 10 includes a male component 12, and a female component 14.

Figure 2:
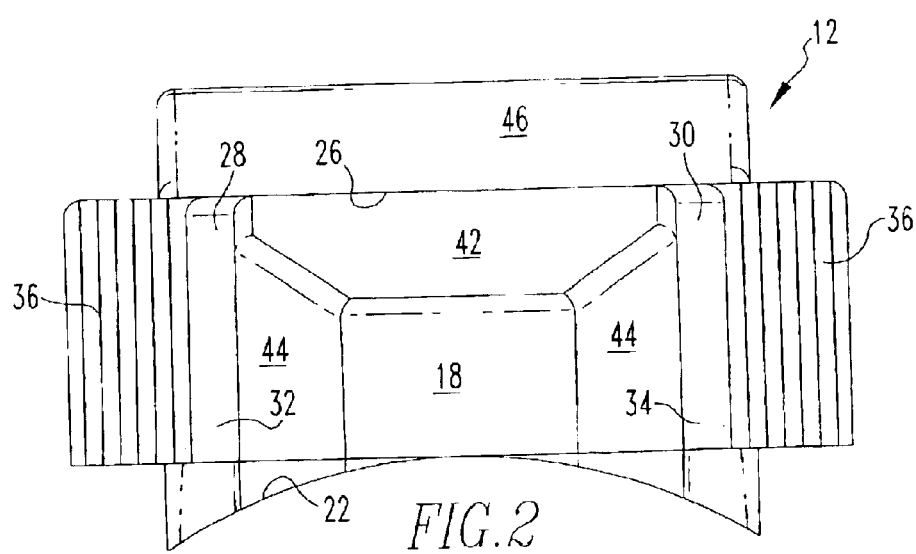
FIG. 2 is bottom view of the male component of a quick connect assembly according to the present invention.
Figure 6:
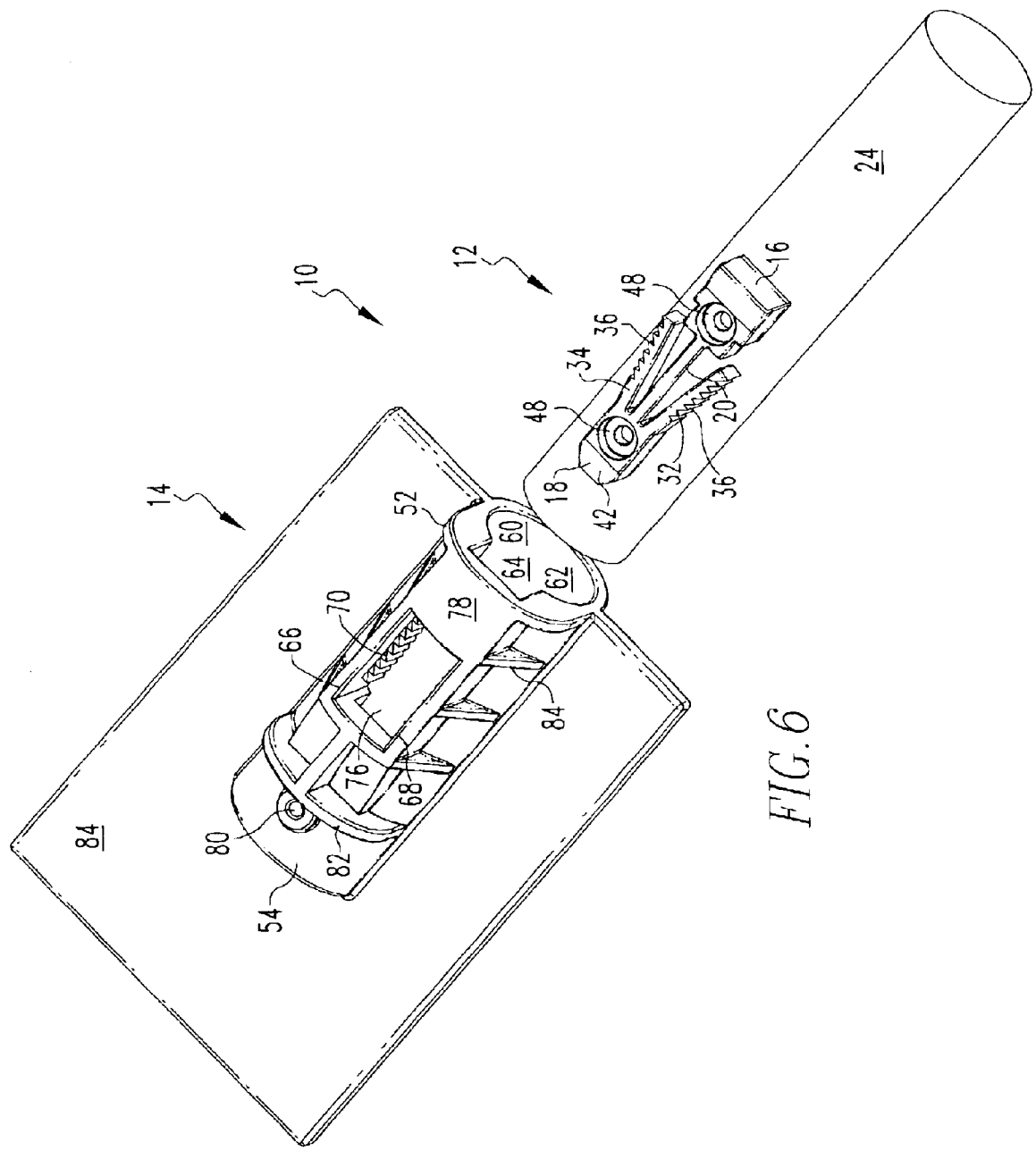
FIG. 6 is an environmental, exploded isometric front view of a quick connect assembly according to the present invention.
Figure 7:
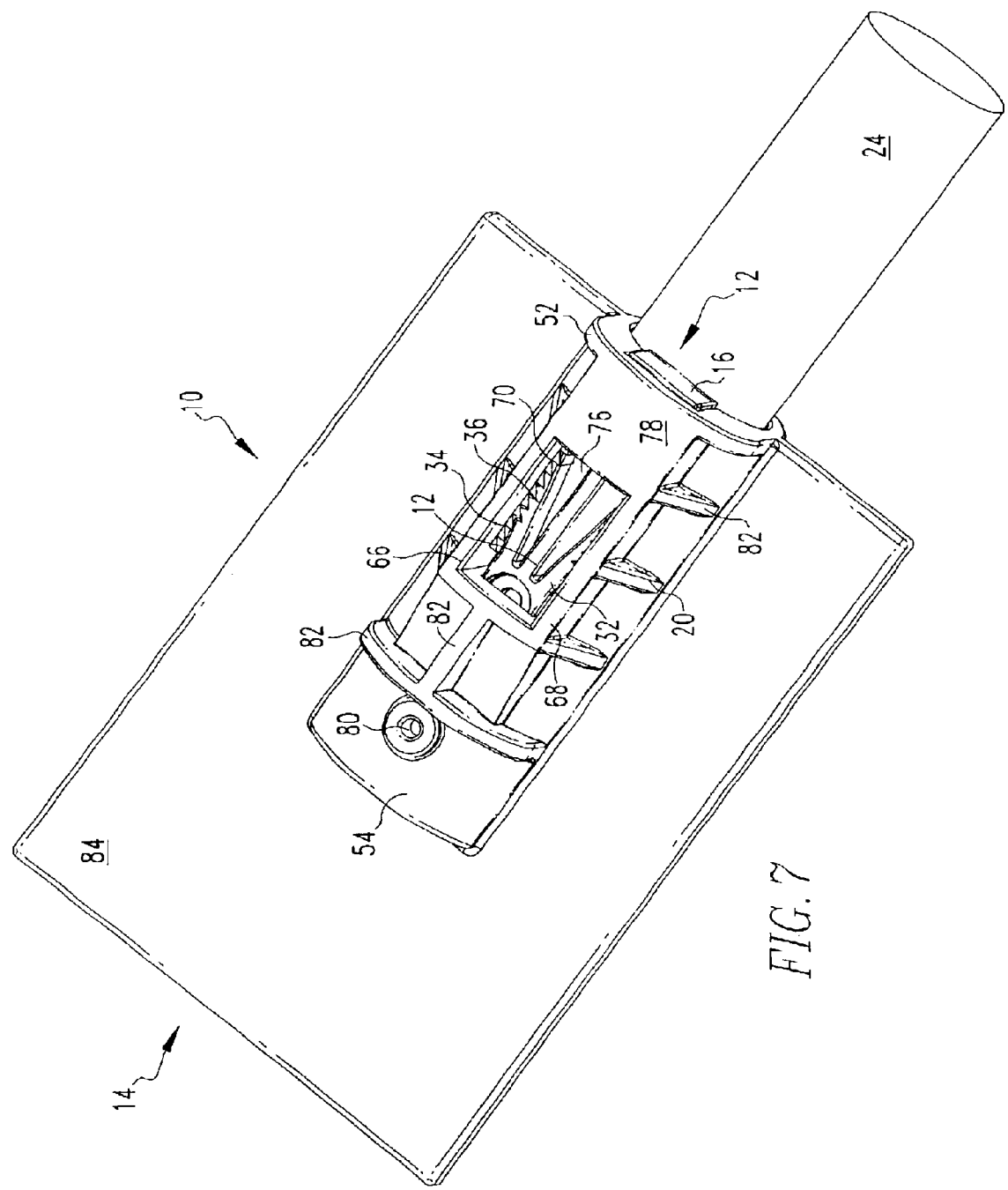
FIG. 7 is an environmental, isometric front view of a quick connect according to the present invention.

The male component 12 is best illustrated in FIGS. 1-2. The male component 12 is preferably an elongated component having a top end 16 and a bottom end 18. A central portion 20 extends between the top end 16 and bottom end 18. The male component 12 also defines a rear face 22 dimensioned and configured to engage a handle. The rear face 22 may, for example, have a concave profile when viewed from either end, with the concave profile having a radius substantially equal to the radius of the handle 24 (FIGS. 6-7). A front face 26 is defined on the male component 12 opposite the rear face 22. A pair of sides 28,30 extend between the front face 26 and rear face 22.

A pair of resilient, flexible arms 32,34 are located on the sides 28, 30, respectively, extending upward and outward from the bottom end 18. Each of the arms 32,34 define a plurality of outwardly facing teeth 36, with each of the teeth 36 defining a top surface 38 and a bottom surface 40. The bottom surface 40 is preferably angled upward, to minimize resistance to downward movement of the male component 12 within a female component 14 to be described below. The top surface 38 may be substantially horizontal or may also be upward angled, being dimensioned and configured to resist upward movement of the male component 12 within the below described female component 14.

The bottom end 18 may define tapered surfaces 42,44. Likewise, the top end 16 may, in some preferred embodiments, include a wedge surface 46. The surfaces 42,46 preferably oriented at substantially the same angle from the remainder of the male component 12.

The top end 16 and bottom end 18 may each define an aperture 48, which may in some examples include a counterbored portion 50 corresponding to the front face 26. The aperture 48 is dimensioned and configured to receive a bolt or screw, with the counterbored portion 50 permitting the head of the bolt or screw to be located completely within the male component 12, facilitating connection of the quick connect assembly.

Figure 3:
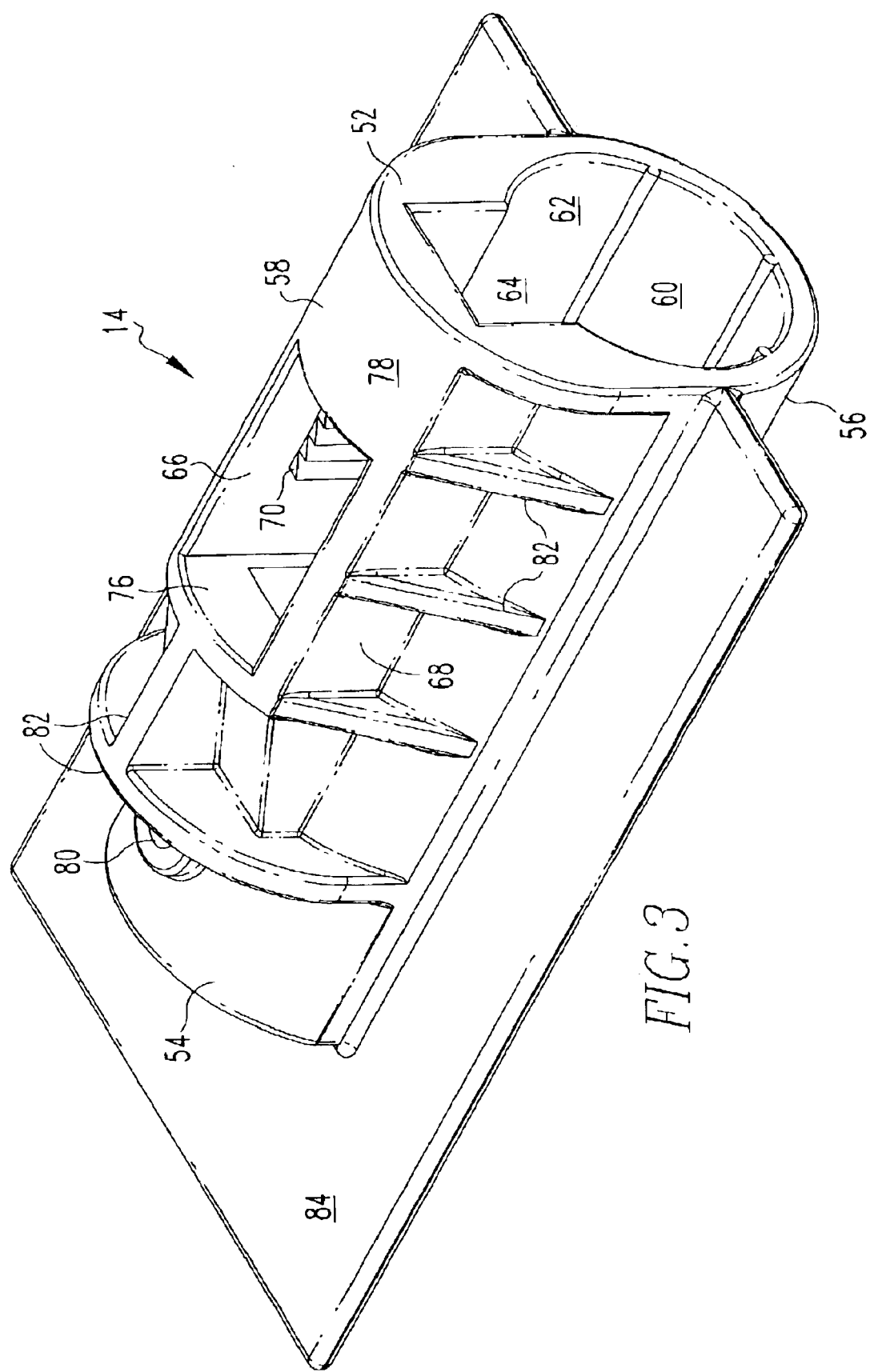
FIG. 3 is an isometric front view of a female component for a quick connect assembly according to the present invention.
Figure 4:
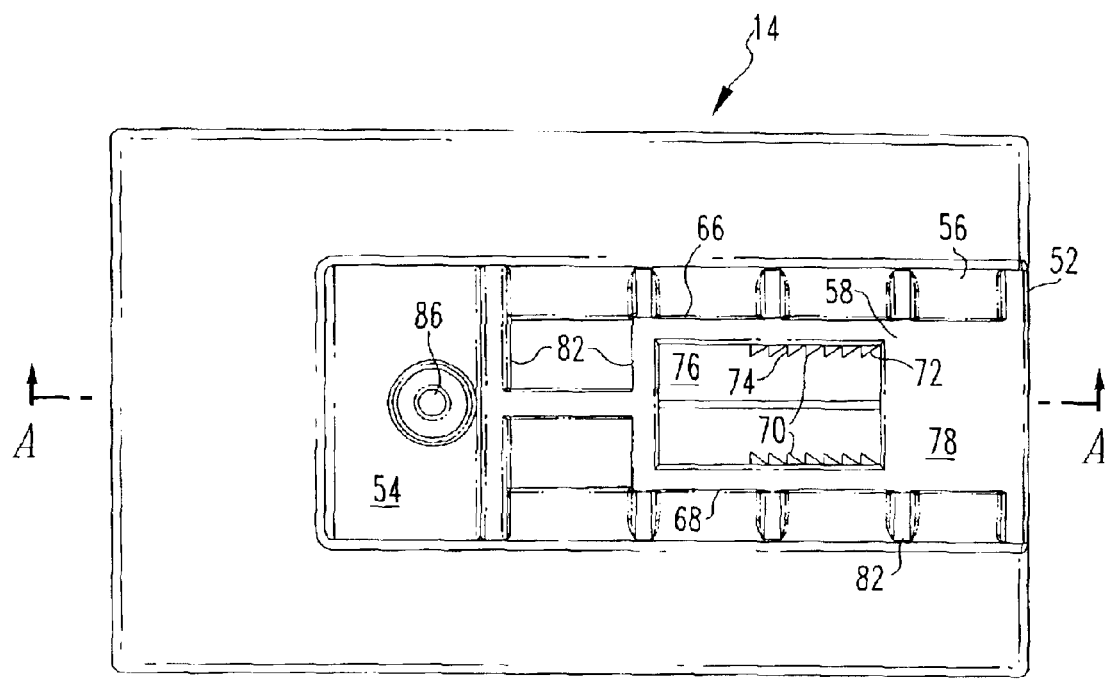
FIG. 4 is a front view of the female component of a quick connect assembly according to the present invention.
Figure 5:
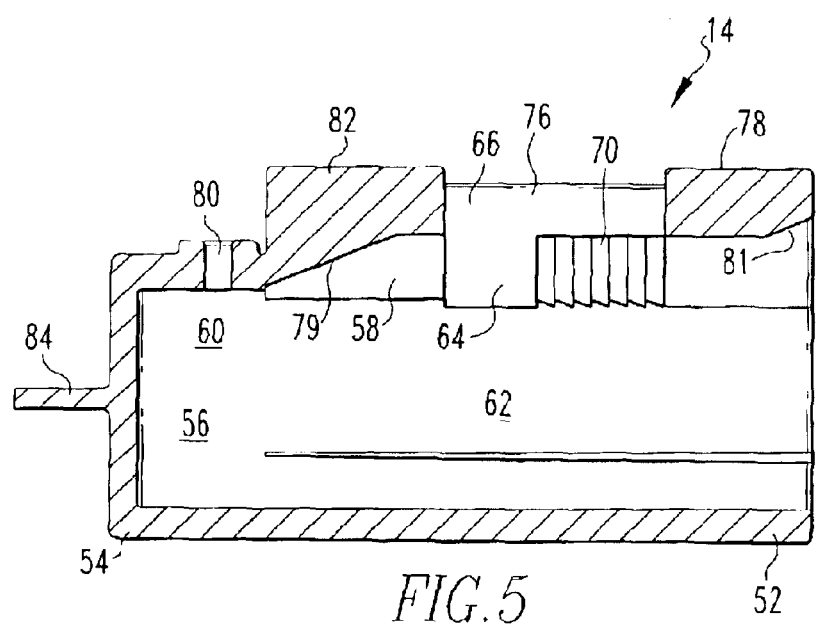
FIG. 5 is a cross-sectional side view of the female components of a quick connect according to the present invention, taken along the lines A—A in FIG. 4.

The female component 14 is best illustrated in FIGS. 3-5. The female component 14 includes a top end 52 and a bottom end 54. A handle receiving portion 56 extends from the top end 52 to the bottom end 54, with a male component receiving portion 58 beginning at the top end 52, and extending downward partway towards the bottom end 54, located immediately adjacent to the handle receiving portion 56. The handle receiving portion 56 and male component receiving portion 58 together define a socket 60, dimensioned and configured to receive the combination of the male component 12 and handle 24 as described below. The socket 60 will in some examples include a substantially cylindrical handle portion 62 and a substantially rectangular male component receiving portion 64. The male component receiving portion 58 includes a pair of opposing side walls 66,68, each of which includes a plurality of inward facing teeth 70. Each of the teeth 70 includes an upward facing surface 72 and a downward facing surface 74. The upward facing surface 72 is preferably angled downward, and the downward facing surface 74 may be horizontal or angled downward. The teeth 70 are dimensioned and configured to engage the teeth 36 of the male component 12. Some preferred embodiments of the female component 14 may include an opening 76 defined within the front wall 78 of the male component receiving portion 58.

The male component receiving portion 58 preferably defines a pair of angled surfaces 79,81, dimensioned and configured to abut the surfaces 42,46, respectively, of the male component 12. Some preferred embodiments of the handle receiving portion 56 may include an aperture 80, dimensioned and configured to receive a bolt or screw passing through the handle receiving portion 56 and into a handle 24 located therein.

Reinforcing ribs 82 may extend between the handle receiving portion 56 and male component receiving portion 58 to provide additional strength to the female component 14. A flange 84 may extend outward from the bottom end sides of the female component 14, providing a means for attaching the female component 14 to a tool. For example, the flange 84 may be secured to the shovel portion of a snow shovel by means including but not limited to welding.

Referring to FIGS. 6-7, the method of using the quick connect assembly 10 is illustrated. The male component 12 will be fastened to a handle 24, possibly by bolts- or screws passing through the apertures 48. The female component 14 will be secured to a tool such as the shovel portion of a snow shovel, as described above. The handle end tool may then be shipped to a different location, with the separation of the handle 24 and tool providing for more efficient packaging of the components. When is desired to secure the handle 24 to the tool, merely inserting the handle 24 into the socket 60 will cause the bottom surfaces 40 of the jaws 36 to interact with the top surfaces 72 of the jaws 70, pushing the arms 32,34 towards the central portion 20, and permitting the male component 12 to enter the male component receiving portion 64 of the socket 60. Once the handle 24 is inserted into the socket 60, the interaction of the upper surfaces 38 of the teeth 36 with the lower surfaces 74 of the teeth 70 will resist removal of the handle 24 from the socket 60. At the same time, the surface 42 of the male component will engage the surface 79 of the female components, and the surface 46 of the male component will engage the surface 81 of the female components. As the handle 24 is pushed further into the socket 60, the interaction of these angled surfaces will push the handle 24 rearward within the socket 60, thereby ensuring a snug fit between the handle 24 and socket 60 despite any variations in tolerance of the diameter of the handle 24 and socket 60. Providing multiple teeth 36 to interact with multiple teeth 70 permits the handle 24 to be secured within the socket 60 at whatever depth is required for the abutting surfaces 42,79 and 46,81 to account for any variations in diameter between the handle 24 and socket 60.

If desired, a tool may be inserted through the opening 76 to depress the arms 32,34, permitting removal of the handle 24. The substantially cylindrical shape of the handle receiving portion 62 of the socket 60, combined with making this portion approximately the same diameter as the handle 24, permits the handle 24 to be inserted all the way to the bottom end 54 of the female component 14, providing maximum resistance to lateral movement of the handle 24. If desired, a screw or bolt may be inserted through the aperture 80 into the handle 24, further securing the handle 24 in place.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A quick connect apparatus for a tool, the tool having a tool portion and an elongated handle, the quick connect apparatus comprising:
    a male component, including:
        a top end;
        a bottom end;
        an elongated central portion between the top end and the bottom end;
        a pair of resilient arms extending upward and outward from the bottom end, the arms defining a plurality of outwardly facing teeth;
        the male component being structured for mounting on the elongated handle; and
    a female component, including a socket defining a handle-receiving portion and a male component receiving portion, the handle-receiving portion being dimensioned and configured to receive the handle and to permit the handle to pass into the lowermost portion of the socket, the male component receiving portion being dimensioned and configured to receive the male component, the male component receiving portion having a pair of opposing walls defining a plurality of inwardly facing teeth thereon, the inwardly facing teeth being dimensioned and configured to engage the outwardly facing teeth and to thereby resist removal of the male connector from the socket, the socket being structured for securing to the tool portion.

2. The quick connect apparatus according to claim 1, wherein the male component receiving portion of the socket further defines an opening dimensioned and configured to permit insertion of a tool for pushing the arms away from the inwardly facing teeth, permitting removal of the male connector from the female connector.

3. The quick connect apparatus according to claim 1, wherein the socket further defines an aperture dimensioned and configured to permit insertion of a bolt or screw therethrough and into the handle.

4. The quick connect apparatus according to claim 1, wherein:
the bottom end and top end of the male component each define a tapered surface; and
the male component receiving portion of the female component defines a pair of angled surfaces dimensioned and configured to abut the angled surfaces defined on the male component.

5. The quick connect apparatus according to claim 4, wherein the angled surfaces defined on the male component and the angled surfaces defined within the female component have substantially the same angle with respect to vertical.

6. The quick connect apparatus according to claim 1, wherein the male component includes a hole dimensioned and configured to receive a bolt or screw defined within its top end and within its bottom end.

7. The quick connect apparatus according to claim 1, wherein the male component includes a bottom face having a concave shape when viewed from either the top or the bottom.

8. A tool, comprising:
a tool portion;
an elongated handle;
a quick connect apparatus, comprising:
a male component, including:
a top end;
a bottom end;
an elongated central portion between the top end and the bottom end;
a pair of resilient arms extending upward and outward from the bottom end, the arms defining a plurality of outwardly facing teeth;
the male component being structured for mounting on the elongated handle; and
a female component, including a socket defining a handle-receiving portion and a male component receiving portion, the handle-receiving portion being dimensioned and configured to receive the handle and to permit the handle to pass into the lowermost portion of the socket, the male component receiving portion being dimensioned and configured to receive the male component, the male component receiving portion having a pair of opposing walls defining a plurality of inwardly facing teeth thereon, the inwardly facing teeth being dimensioned and configured to engage the outwardly facing teeth and to thereby resist removal of the male connector from the socket, the socket being structured for securing to the tool portion.

9. The tool according to claim 8, wherein the male component receiving portion of the socket further defines an opening dimensioned and configured to permit insertion of a tool for pushing the arms away from the inwardly facing teeth, permitting removal of the male connector from the female connector.

10. The tool according to claim 8, wherein the socket further defines an aperture dimensioned and configured to permit insertion of a bolt or screw therethrough and into the handle.

11. The tool according to claim 8, wherein:
the bottom end and top end of the male component each define a tapered surface; and
the male component receiving portion of the female component defines a pair of angled surfaces dimensioned and configured to abut the angled surfaces defined on the male component.

12. The tool according to claim 11, wherein the angled surfaces defined on the male component and the angled surfaces defined within the female component have substantially the same angle with respect to vertical.

13. The tool according to claim 8, wherein the male component includes a hole dimensioned and configured to receive a bolt or screw defined within its top end and within its bottom end.

14. The tool according to claim 8, wherein the male component includes a bottom face having a concave shape when viewed from either the top or the bottom.

15. The tool according to claim 8, wherein the tool is a shovel.

16. A method of assembling a tool, the tool having a tool portion and an elongated handle, the method comprising;
providing a quick connect apparatus, the quick connect apparatus comprising:
a male component, including:
a top end;
a bottom end;
an elongated central portion between the top end and the bottom end;
a pair of resilient arms extending upward and outward from the bottom end, the arms defining a plurality of outwardly facing teeth;
the male component being structured for mounting on the elongated handle; and
a female component, including a socket defining a handle-receiving portion and a male component receiving portion, the handle-receiving portion being dimensioned and configured to receive the handle, the male component receiving portion being dimensioned and configured to receive the male component, the male component receiving portion having a pair of opposing walls defining a plurality of inwardly facing teeth thereon, the inwardly facing teeth being dimensioned and configured to engage the outwardly facing teeth and to thereby resist removal of the male connector from the socket, the socket being structured for securing to the tool portion
securing the male component to the elongated handle;
securing the female component to the tool portion;
inserting the handle into the socket, thereby securing the handle within the socket through the engagement of the outwardly facing teeth with the inwardly facing teeth.

17. The method according to claim 16, further comprising securing the handle within the socket using a bolt or screw passing through an aperture defined within the socket.

18. The method according to claim 16, wherein the female component includes a flange for securing to the tool portion.

19. The method according to claim 18, wherein the female component is secured to the tool portion by welding the flange to the tool portion.

20. The method according to claim 16, further comprising providing mating angled surfaces defined within the top and bottom of the male component and the male component receiving portion of the female component, dimensioned and configured to bias the handle rearward within the socket as the handle is pushed downward into the socket.

* * * * *

UNITED STATES PATENT AND TRADEMARK OFFICE
CERTIFICATE OF CORRECTION

PATENT NO. : 6,824,180 B2
DATED : November 30, 2004
INVENTOR(S) : Michael Tomchak It is certified that error appears in the above-identified patent and that said Letters Patent is hereby corrected as shown below:

<u>Title page,</u>
Item [56], References Cited, U.S. PATENT DOCUMENTS, last name "Duppenglesser" should read -- Duppengiesser --.

Signed and Sealed this

Seventeenth Day of May, 2005

JON W. DUDAS
*Director of the United States Patent and Trademark Office*